(12) United States Patent
Schwager et al.

(10) Patent No.: US 9,835,889 B2
(45) Date of Patent: *Dec. 5, 2017

(54) DISPLAY DEVICE WITH COMPACT INTEGRATED STRUCTURAL DESIGN

(71) Applicant: Dell Products L.P., Round Rock, TX (US)

(72) Inventors: Mark Andrew Schwager, Cedar Park, TX (US); Stefan Peana, Austin, TX (US); Deeder M. Aurongzeb, Austin, TX (US); David Michael Meyers, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/484,876

(22) Filed: Apr. 11, 2017

(65) Prior Publication Data

US 2017/0219869 A1 Aug. 3, 2017

Related U.S. Application Data

(63) Continuation of application No. 14/802,841, filed on Jul. 17, 2015, now Pat. No. 9,658,480.

(51) Int. Cl.
*G02F 1/1333* (2006.01)

(52) U.S. Cl.
CPC .... *G02F 1/133308* (2013.01); *G02F 1/13338* (2013.01); *G02F 1/133345* (2013.01); *G02F 2001/133314* (2013.01); *G02F 2001/133322* (2013.01); *G02F 2001/133331* (2013.01); *G02F 2201/46* (2013.01)

(58) Field of Classification Search
CPC . G02F 1/1333; G02F 1/13338; G02F 1/13345
See application file for complete search history.

(56) References Cited

U.S. PATENT DOCUMENTS

| | | |
|---|---|---|
| 9,474,169 B2 | 10/2016 | Park et al. |
| 9,516,771 B2 | 12/2016 | Byeon |
| 2014/0176852 A1 | 6/2014 | Ha |
| 2015/0177548 A1 | 6/2015 | Jeon et al. |
| 2015/0185527 A1 | 7/2015 | Chang |
| 2016/0202726 A1* | 7/2016 | Seen .................. H04M 1/0268 349/42 |
| 2016/0291386 A1* | 10/2016 | Wang ...................... G02B 6/00 |

* cited by examiner

*Primary Examiner* — Timothy L Rude
(74) *Attorney, Agent, or Firm* — Baker Botts L.L.P.

(57) ABSTRACT

A display device with compact integrated structural design in a portable information handling system may have a narrow or no border. The display device with compact integrated structural design may include a combined display assembly that is fixed to an A-cover using selected means of attachment. The combined display assembly may internally integrate a backplate, a backlight, a liquid crystal display (LCD) cell, and a cover glass. The cover glass may be direct bonded to the LCD cell without direct attachment to the A-frame.

20 Claims, 4 Drawing Sheets

DISPLAY DEVICE WITH COMPACT INTEGRATED STRUCTURAL DESIGN

RELATED APPLICATIONS

This application is a continuation of U.S. patent application Ser. No. 14/802,841 filed Jul. 17, 2015, the contents of which is incorporated by reference herein.

BACKGROUND

Field of the Disclosure

This disclosure relates generally to information handling systems and, more particularly, to a display device with compact integrated structural design.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery. New designs for the display devices included with portable information handling systems include ultra-thin implementations with narrow or no border.

SUMMARY

In one aspect, a disclosed display device with compact integrated structural design is for portable information handling systems. The display device may include a combined display assembly and an A-cover. In the display device, the combined display assembly may include a backplate including at least one backplate tab at a first edge of the display device. In the display device, the combined display assembly may further include a backlight, a liquid crystal display (LCD) cell, a cover glass, and at least one attachment hole at a second edge of the display device opposite the first edge. In the display device, the A-cover may further include at least one slot corresponding to the backplate tabs at the first edge, at least one conductive edge at an inner surface of the A-cover, at least one conductive gasket, at least one adhesive pad, and at least one threaded receptacle respectively corresponding to the attachment holes. In the display device, attachment of the cover glass to the combined display assembly may consist of a direct bond between the cover glass and the LCD cell. In the display device, the conductive edges and the conductive gaskets may be in electrical contact with the combined display assembly. In the display device, attachment of the combined display assembly with the A-cover may consist of the backplate tabs mating with the slots, the adhesive pads bonding to the backplate, and at least one mechanical fastener penetrating the attachment holes and the threaded receptacles.

In any of the disclosed embodiments of the display device, attachment of the backlight to the LCD cell may include an adhesive bond within the combined display assembly. The display device may further include an insulating film with the combined display assembly at a third edge perpendicular to the first edge. In the display device, the insulating film may electrically insulate the backlight and the LCD cell.

In any of the disclosed embodiments, the display device may further include a first plurality of the backplate tabs included with the combined display assembly, and a second plurality of the slots included with the A-cover, the first plurality corresponding to the second plurality. In any of the disclosed embodiments, the display device may further include a third plurality of the attachment holes included with the combined display assembly, a fourth plurality of the threaded receptacles included with the A-cover, and a fifth plurality of the mechanical fasteners, the third plurality corresponding to the fourth plurality and the fifth plurality.

In any of the disclosed embodiments, the display device may further include a touch panel included at least in part with the cover glass.

In another aspect, a disclosed information handling system includes a display device with compact integrated structural design. The display device may include a combined display assembly and an A-cover. In the information handling system, the combined display assembly may include a backplate including at least one backplate tab at a first edge of the display device. In the information handling system, the combined display assembly may further include a backlight, a liquid crystal display (LCD) cell, a cover glass, and at least one attachment hole at a second edge of the display device opposite the first edge. In the information handling system, the A-cover may further include at least one slot corresponding to the backplate tabs at the first edge, at least one conductive edge at an inner surface of the A-cover, at least one conductive gasket, at least one adhesive pad, and at least one threaded receptacle respectively corresponding to the attachment holes. In the information handling system, attachment of the cover glass to the combined display assembly may consist of a direct bond between the cover glass and the LCD cell. In the information handling system, the conductive edges and the conductive gaskets may be in electrical contact with the combined display assembly. In the information handling system, attachment of the combined display assembly with the A-cover may consist of the backplate tabs mating with the slots, the adhesive pads bonding to the backplate, and at least one mechanical fastener penetrating the attachment holes and the threaded receptacles.

In any of the disclosed embodiments of the information handling system, attachment of the backlight to the LCD cell may include an adhesive bond within the combined display assembly. In the information handling system, the display device may further include an insulating film with the combined display assembly at a third edge perpendicular to the first edge. In the information handling system, the insulating film may electrically insulate the backlight and the LCD cell.

In any of the disclosed embodiments, the information handling system may further include a first plurality of the backplate tabs included with the combined display assembly, and a second plurality of the slots included with the A-cover, the first plurality corresponding to the second plurality. In any of the disclosed embodiments, the information handling system may further include a third plurality of the attachment holes included with the combined display assembly, a fourth plurality of the threaded receptacles included with the A-cover, and a fifth plurality of the mechanical fasteners, the third plurality corresponding to the fourth plurality and the fifth plurality.

In any of the disclosed embodiments, the information handling system may further include a touch panel included at least in part with the cover glass.

In a further aspect, a disclosed method is for assembling a display device for portable information handling systems. The method may include assembling a combined display assembly. In the method, the combined display assembly may include a backplate including at least one backplate tab at a first edge of the display device. In the method, the combined display assembly may further include a backlight, a liquid crystal display (LCD) cell, a cover glass, and at least one attachment hole at a second edge of the display device opposite the first edge. The method may include forming an A-cover. In the method, the A-cover may further include at least one slot corresponding to the backplate tabs at the first edge, at least one conductive edge at an inner surface of the A-cover, at least one conductive gasket, at least one adhesive pad, and at least one threaded receptacle respectively corresponding to the attachment holes. The method may further include aligning the backplate tabs in the combined display assembly with the slots in the A-cover, and making electrical connections between the combined display assembly and the A-cover. In the method, the conductive edges and the conductive gaskets may be in electrical contact with the combined display assembly. The method may still further include fixing the combined display assembly and the A-cover at the second edge using at least one mechanical fastener penetrating the attachment holes and the threaded receptacles. In the method, attachment of the cover glass to the combined display assembly may consist of a direct bond between the cover glass and the LCD cell. In the method, attachment of the combined display assembly with the A-cover may consist of the backplate tabs mating with the slots, the adhesive pads bonding to the backplate, and the mechanical fasteners penetrating the attachment holes and the threaded receptacles.

In any of the disclosed embodiments of the method, attachment of the backlight to the LCD cell may include an adhesive bond within the combined display assembly. In any of the disclosed embodiments of the method, the combined display assembly may further include an insulating film within the combined display assembly at a third edge perpendicular to the first edge. In the method, the insulating film may electrically insulate the backlight and the LCD cell.

In any of the disclosed embodiments of the method, the combined display assembly may further include a first plurality of the backplate tabs, while the A-cover may include a second plurality of the slots, the first plurality corresponding to the second plurality.

In any of the disclosed embodiments of the method, the combined display assembly may further include a third plurality of the attachment holes, while the A-cover further includes a fourth plurality of the threaded receptacles. In the method, fixing the combined display assembly and the A-cover at the second edge may include using a fifth plurality of the mechanical fasteners, the third plurality corresponding to the fourth plurality and the fifth plurality.

In any of the disclosed embodiments of the method, the combined display assembly may further include a touch panel included at least in part with the cover glass.

In any of the disclosed embodiments of the method, making the electrical connections may further include making functional connections for the LCD cell, and making functional connections for the touch panel.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4, 5, 6 and 7 wherein like numbers are used to indicate like and corresponding parts.

Figure 1:
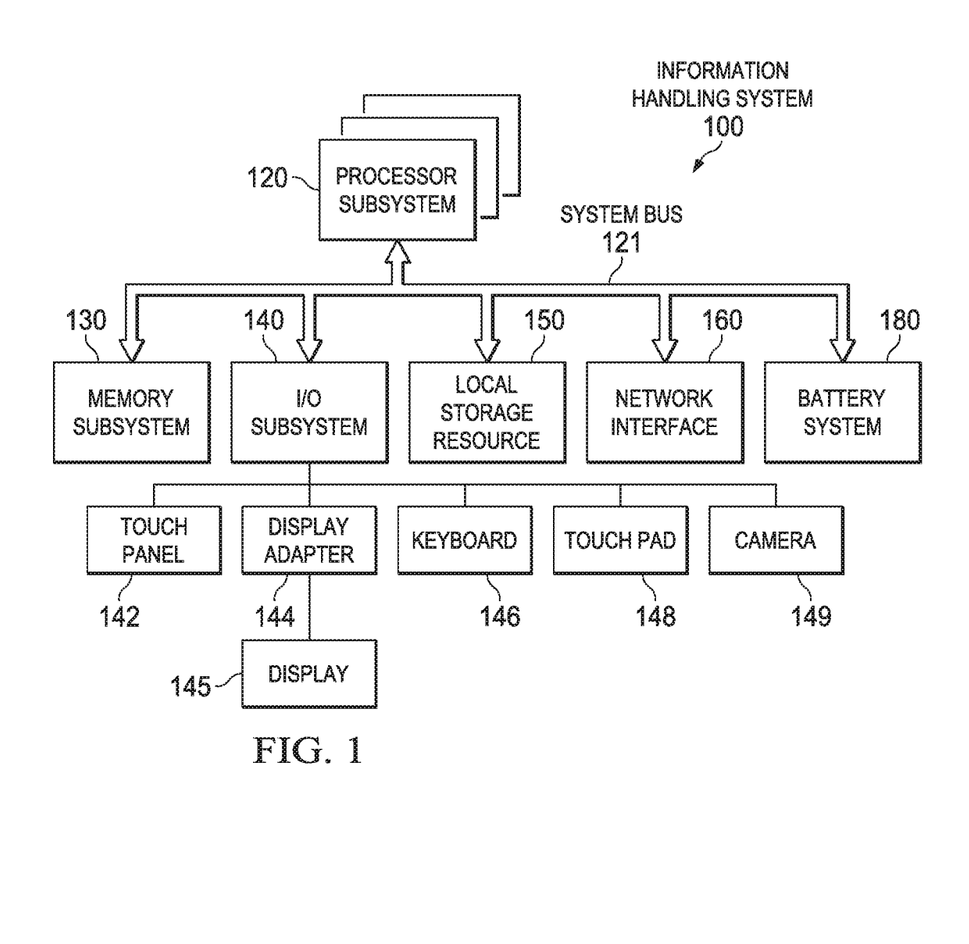
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160, and battery system 180. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. Also shown is battery system 180, which may represent a rechargeable battery and related components included with information handling system 100.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or another component of physical hardware 102). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. Touch panel 142 may include circuitry for enabling touch functionality in conjunction with a display device, shown as display 145, that is driven by display adapter 144. Camera 149 may represent any of a variety of imaging devices, such as a video camera, infrared camera, or combinations thereof.

In various embodiments of information handling system 100, such as portable devices or so-called all-in-one devices, display 145 may be mechanically integrated to other components. Furthermore, touch panel 142 may be integrated into display 145 such that a touch user interface is provided to a user. The touch user interface typically coincides with a pixel space of display 145 such that touch inputs correspond to certain display pixels, which may present user interface elements, such as buttons, menus, input fields, etc., to the user.

As display 145 and touch panel 142 become more lightweight and thinner, the display portion may extend nearly to the edge of display 145 and may be implemented with a very small or no border. Accordingly, the construction and assembly of display 145 may increasingly involve smaller and smaller components and part dimensions.

In various embodiments, display 145 may include a display panel cover (also referred to as an A-cover) that covers an opposite face of display 145 from a display surface viewed by a user. The display panel cover may serve as an external component of information handling system 100 and may accordingly serve an aesthetic and structural function. Aesthetically, it may be desirable that the display panel cover have an attractive appearance and be made using high quality materials that match expectations of modern users. Oftentimes the display panel cover will carry a logo or a mark of the manufacturer. Structurally, the display panel cover provides protection and packaging for display components, as well as enabling assembly of display 145. In addition, for modern display designs that are very thin and have little or no border, the display panel cover may provide an important contribution to an overall stiffness of display 145.

As will be described in further detail herein, a display device may be implemented with a compact integrated structural design. The compact integrated structural design may include the A-cover and a combined display assembly. The combined display assembly may include a backlight, a liquid crystal display (LCD) cell (open cell), a cover glass, and optionally a touch panel, which are bonded together in a unitary manner. The combined display assembly may itself serve as a structural component in the display device, and may be designed without additional internal mechanical supports, such as frames or a secondary cover panel (also referred to as a B-cover). In particular, the cover glass may be direct bonded to the LCD cell to hold the cover glass in the display device, while the backlight may be bonded to the LCD cell using an adhesive at particular locations. During assembly of the display device disclosed herein, the combined display assembly may be mated with the A-cover using tabs in the combined display assembly and corresponding slots in the A-cover at one edge of the display device, while at the opposing edge the combined display assembly and the A-cover may be screwed together.

Figure 2:
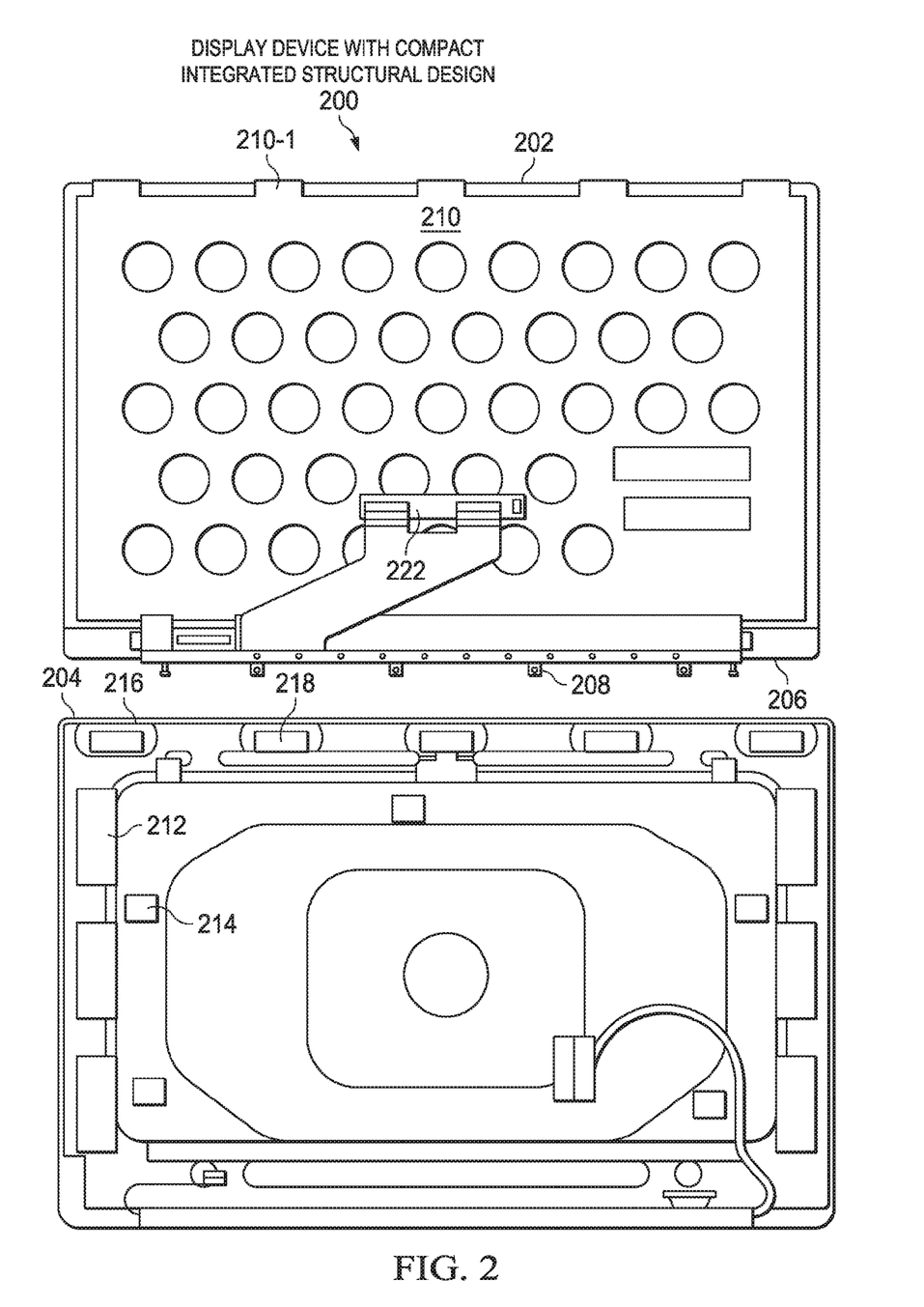
FIG. 2 is an illustration of selected elements of an embodiment of a display device with compact integrated structural design.

Referring now to FIG. 2, selected elements of an embodiment of a display device 200 with compact integrated structural design for a portable information handling system, such as information handling system 100 in FIG. 1, are illustrated. FIG. 2 is a schematic illustration and is not drawn to scale. As shown, display device 200 may be integrated within a laptop or notebook computer, for example, such that display device 200 may be hinged to a computing device portion (not shown) of the portable information handling system. In FIG. 2, display device 200 is shown comprising combined display assembly 202 and A-cover 204, of which internal faces are shown and for which corresponding opposing external faces are obscured from view. Accordingly, as shown in FIG. 2, an opposing external face of combined display assembly 202 includes a display surface for output to a user, while an opposing external face of A-cover 204 includes a rear external surface of display device 200.

In FIG. 2, combined display assembly 202 is shown covered by a backplate 210, which may be a relatively thin sheet metal plate that is stamped with certain features. Behind backplate 210 are a backlight, a liquid crystal display (LCD) cell (open cell), a cover glass, and optionally a touch panel, as will be described in further detail below, but which are obscured from view in FIG. 2. The features in backplate 210 include backplate tabs 210-1, which form a mating mechanism to retain and detent combined display assembly 202 with A-cover 204. Also visible in FIG. 2 and included with combined display assembly 202 are attachment holes 208 at an opposing end from backplate tabs 210-1, which are used to assemble and secure combined display assembly 202 to A-cover 204. Also visible in FIG. 2 and included with combined display assembly 202 is cable receptacle 222, which may receive corresponding cable assemblies in A-cover 204 during assembly of display device 200. Specifically, cable receptacle 222 may include cable connectors (or plugs) for a display cable and a touch controller cable, which may be combined in some embodiments. In particular embodiments, the display cable may conform to an Embedded Display Port (eDP) standard developed by the Video Electronics Standards Association (VESA). Furthermore, combined display assembly 202 may include a bottom bezel 206, which represents a bottom edge or border of display device 200. Bottom bezel 206 may provide a location for cables and other connectors to pass through to A-cover 204, or to the computing device portion of the portable information handling system.

In FIG. 2, A-cover 204 is shown including various features and elements for mating with combined display assembly 202 to form display device 200. Specifically, A-cover 204 includes slots 218, which mate with backplate tabs 210-1 during assembly to hold display device 200 together at a first edge. At a second edge opposing the first edge, A-cover 204 may include corresponding nuts, threaded anchors, or other threaded receptacles for receiving screws at attachment holes 208. Additionally, A-cover 204 may include grounding elements, such as conductive gaskets 214 and a conductive inner edge 216 that mate electronically with corresponding ground terminals in combined display assembly 202. In this manner, a desired degree of grounding and shielding, for example for electromagnetic interference purposes, may be achieved in display device 200. Also visible in FIG. 2 are adhesive pads 212 that represent locations where combined display assembly 202 is bonded to A-cover 204 upon assembly. A pull string may be included to enable release at adhesive pads 212 for subsequent disassembly of display device 200.

Figure 3:
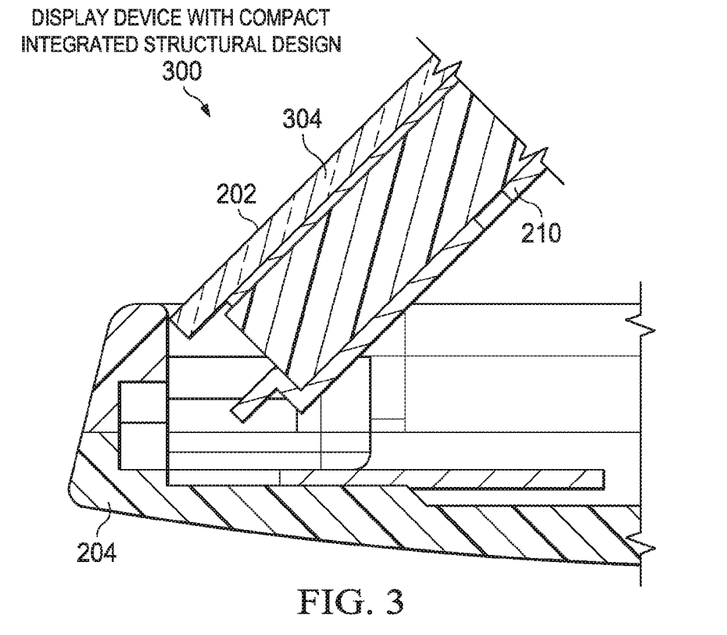
FIG. 3 is an illustration of selected elements of an embodiment of a display device with compact integrated structural design.

Referring now to FIG. 3, selected elements of an embodiment of a display device 300 with compact integrated structural design for a portable information handling system, such as information handling system 100 in FIG. 1, are illustrated. FIG. 3 is a schematic illustration and is not drawn to scale. FIG. 3 shows a sectional view of the mating of combined display assembly 202 with A-cover 204 at the first edge, as described above with respect to FIGURE. Specifically, when combined display assembly 202 is assembled with A-cover 204, an edge of cover glass 304 (included with combined display assembly 202) is positioned at the first edge such that backplate tabs 210-1 are aligned with corresponding slots 218. Then, as combined display assembly 202 is rotated into final position into A-cover 204, backplate tabs 210-1 become secured into slots 218 along the first edge. In this manner, combined display assembly 202 is secured to A-cover 204 using backplate 210, while other elements of combined display assembly 202 are not directly bonded to A-cover 204. In particular, cover glass 304 is direct bonded to combined display assembly 202 and is not directly attached to A-cover 204, which enables further reduction in an overall thickness of display device 300.

Figure 4:
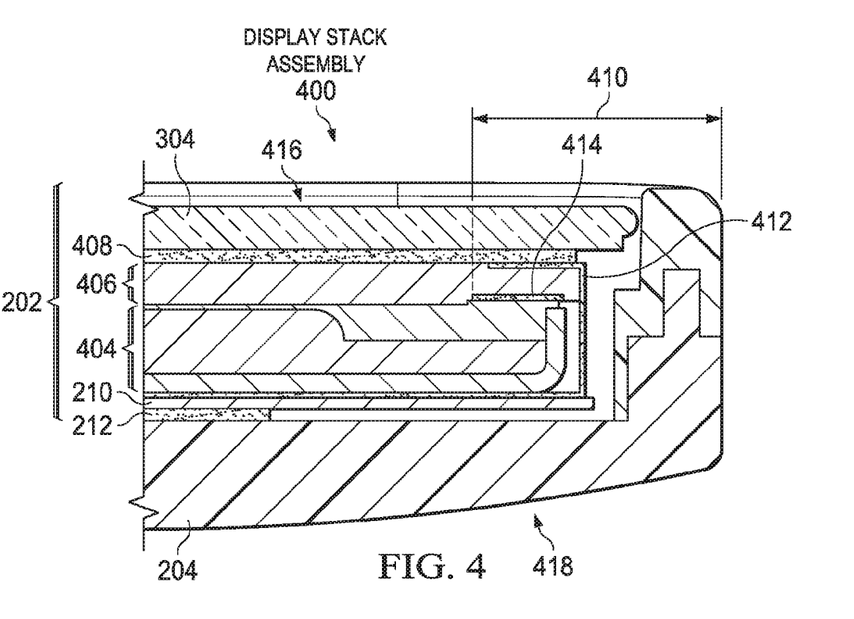
FIG. 4 is an illustration of selected elements of an embodiment of a display device with compact integrated structural design.

Referring now to FIG. 4, selected elements of an embodiment of a display stack assembly 400 are illustrated. Display stack assembly 400 shows a sectional view at an edge of display device 200 and 300 after assembly of combined display assembly 202 with A-cover 204, as shown in FIGS. 2 and 3. FIG. 4 is a schematic illustration and is not drawn to scale. As shown, display stack assembly 400 illustrates various layered elements included in a thin display device having a compact integrated structural design, such as in a portable information handling system. One embodiment of the construction of display stack assembly 400 is shown in a cut-away view at an edge portion in FIG. 4, which enables a display having a very small or no border to be implemented. It is noted that different constructions of display stack assembly 400 may be used, as disclosed herein.

In display stack assembly 400, cover glass 304 is shown forming a display output surface 416, which is presented to a user. It is noted that cover glass 304 may include a touch panel or touch sensors to provide touch functionality to the user. Direct bond layer 408 represents a transparent adhesive layer that may extend substantially over display output surface 416 to bond cover glass 304 with LCD open cell 406. Backlight 404 may be bonded to LCD open cell 406 using adhesive 414, which is integrated within combined display assembly 202. In various embodiments, display stack assembly 400 allows light to be transmitted from backlight 404, through LCD open cell 406 towards cover glass 304 to produce a display image. Backlight 404 and LCD open cell 406 may further be protected and held together using insulating film 412, which may provide electrical insulation for signals and power lines. In various embodiments, insulating film 412 may be a polyethylene terephthalate (PET) or similar film. Additionally in display stack assembly 400, combined display assembly 202 may be bonded to A-cover 204 at adhesive pads 212, shown previously in FIG. 2. Adhesive pads 212 may accordingly contact A-cover 204 and backplate 210. A-cover 204 may form outer surface 418 of the portable information handling system, as described above.

It is noted that an overall thickness of display stack 400 may be less than about 2.0 mm, and may approach 1.5 mm in particular embodiments. Despite this ultra-thin thickness, display stack assembly 400 may provide for a relatively stiff and lightweight construction for sizes up to about 17" diagonal display devices. Furthermore, display stack assembly 400 may provide for ultra narrow borders at the side edges and top edges of the display device, such that the display surface 416 appears to extend to a mechanical edge of the display device to a user, without a bezel or border. For example, distance 410 may represent a length between an outer edge and an active area of the display device constructed with display stack assembly 400 and may be minimized in various embodiments.

Figure 5:
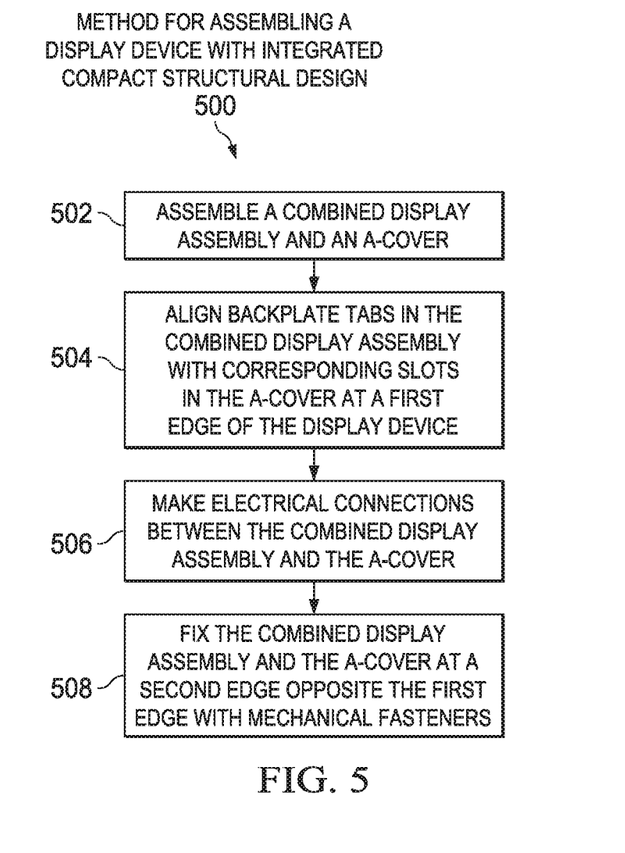
FIG. 5 is a flow chart of selected elements of an embodiment of a method for assembling a display device with compact integrated structural design.

Referring now to FIG. 5, a block diagram of selected elements of an embodiment of method 500 for assembling a display device with compact integrated structural design, as described herein, is depicted in flow chart form. It is noted that certain operations described in method 500 may be optional or may be rearranged in different embodiments.

Method 500 may begin at, step 502, by assembling a combined display assembly and an A-cover. In some embodiments, the combined display assembly may include a touch panel, such as included at least in part with a cover glass. At step 504, backplate tabs in the combined display assembly may be aligned with corresponding slots in the A-cover at a first edge of the display device. At step 506, electrical connections between the combined display assembly and the A-cover may be made. The electrical connections may include grounding and shielding connections at an edge of the A-cover. The electrical connections may include grounding and shielding connections at conductive gaskets between the combined display assembly and the A-cover. It is noted that the conductive gaskets may be mounted to at least one of the combined display assembly and the A-cover. The electrical connections may include functional connections for an LCD and a touch panel. The electrical connections may be made using cables and receptacles. The electrical connections may be made using fixed connectors. At step 508, the combined display assembly and the A-cover may be fixed with mechanical fasteners at a second edge opposite the first edge. The mechanical fasteners may penetrate attachment holes in the combined display assembly and threaded receptacles in the A-cover.

As disclosed herein, a display device with compact integrated structural design in a portable information handling system may have a narrow or no border. The display device with compact integrated structural design may include a combined display assembly that is fixed to an A-cover using selected means of attachment. The combined display assembly may internally integrate a backplate, a backlight, a liquid crystal display (LCD) cell, and a cover glass. The cover glass may be direct bonded to the LCD cell without direct attachment to the A-frame.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A display device for portable information handling systems, comprising:
    a combined display assembly including a backlight, a liquid crystal display (LCD) cell, and a backplate;
    an A-cover including at least one conductive edge, at least one conductive gasket, and at least one slot; and
    a cover glass,
    wherein:
        the cover glass is attached to the combined display assembly with a direct bond between the cover glass and the LCD cell;
        the at least one conductive edge and the at least one conductive gasket of the A-cover are in electrical contact with the combined display assembly; and
        at least one backplate tab of the backplate in the combined display assembly is mated with the at least one slot in the A cover.

2. The display device of claim 1, wherein the cover glass attached to the combined display assembly further comprises:
    at least one mechanical fastener penetrating at least one attachment hole in the combined display assembly and at least one threaded receptacle included in the A-cover.

3. The display device of claim 2, further comprising:
    a third plurality of the attachment holes included with the combined display assembly;
    a fourth plurality of the threaded receptacles included with the A-cover; and
    a fifth plurality of the mechanical fasteners, the third plurality corresponding to the fourth plurality and the fifth plurality.

4. The display device of claim 1, wherein the backlight is attached to the LCD cell with an adhesive bond included within the combined display assembly.

5. The display device of claim 1, further comprising:
    an insulating film included with the combined display assembly at a third edge of the display device perpendicular to a first edge corresponding to the backplate tabs, wherein the insulating film electrically insulates the backlight and the LCD cell.

6. The display device of claim 1, further comprising:
a first plurality of the backplate tabs included with the combined display assembly at the first edge; and
a second plurality of the slots included with the A-cover at a second edge opposite to the first edge, the first plurality corresponding to the second plurality.

7. The display device of claim 1, further comprising:
a touch panel included at least in part with the cover glass.

8. An information handling system comprising a display device, the display device further comprising:
a combined display assembly including a backlight and a liquid crystal display (LCD) cell, and a backplate;
an A-cover including at least one conductive edge, at least one conductive gasket, and at least one slot; and
a cover glass,
wherein:
the cover glass is attached to the combined display assembly with a direct bond between the cover glass and the LCD cell;
the at least one conductive edge and the at least one conductive gasket of the A-cover are in electrical contact with the combined display assembly; and
at least one backplate tab of the backplate in the combined display assembly is mated with the at least one slot in the A cover.

9. The information handling system of claim 8, wherein the cover glass attached to the combined display assembly further comprises:
at least one mechanical fastener penetrating at least one attachment hole in the combined display assembly and at least one threaded receptacle included in the A-cover; and
wherein attachment of the backlight to the LCD cell comprises an adhesive bond included within the combined display assembly.

10. The information handling system of claim 8, further comprising:
an insulating film included with the combined display assembly at a third edge perpendicular to the first edge, wherein the insulating film electrically insulates the backlight and the LCD cell.

11. The information handling system of claim 8, further comprising:
a first plurality of the backplate tabs included with the combined display assembly at the first edge; and
a second plurality of the slots included with the A-cover at a second edge opposite to the first edge, the first plurality corresponding to the second plurality.

12. The information handling system of claim 8, further comprising:
a third plurality of the attachment holes included with the combined display assembly;
a fourth plurality of the threaded receptacles included with the A-cover; and
a fifth plurality of the mechanical fasteners, the third plurality corresponding to the fourth plurality and the fifth plurality.

13. The information handling system of claim 8, further comprising:
a touch panel included at least in part with the cover glass.

14. A method for assembling a display device, the method comprising:
assembling a combined display assembly, the combined display assembly comprising:
a backplate including at least one backplate tab at a first edge of the display device;
a backlight;
a liquid crystal display (LCD) cell;
a cover glass; and
at least one attachment hole at a second edge of the display device opposite the first edge;
forming an A-cover, the A-cover further comprising:
at least one slot corresponding to the backplate tabs at the first edge;
at least one conductive edge at an inner surface of the A-cover;
at least one conductive gasket;
at least one adhesive pad; and
at least one threaded receptacle respectively corresponding to the attachment holes;
aligning the backplate tabs in the combined display assembly with the slots in the A-cover;
making electrical connections between the combined display assembly and the A-cover, further comprising electrically connecting the conductive edges and the conductive gaskets a with the combined display assembly; and
fixing the combined display assembly and the A-cover at the second edge using at least one mechanical fastener penetrating the attachment holes and the threaded receptacles, further comprising attaching the cover glass to the combined display assembly with a direct bond between the cover glass and the LCD cell.

15. The method of claim 14, wherein attaching the combined display assembly to the A-cover further comprises:
mating the backplate tabs with the slots;
bonding the adhesive pads to the backplate;
installing the mechanical fasteners to penetrate the attachment holes and the threaded receptacles; and
attaching the backlight to the LCD cell with an adhesive bond included within the combined display assembly.

16. The method of claim 14, wherein the combined display assembly further comprises:
an insulating film included with the combined display assembly at a third edge perpendicular to the first edge, wherein the insulating film electrically insulates the backlight and the LCD cell.

17. The method of claim 14, wherein the combined display assembly further comprises a first plurality of the backplate tabs, and wherein the A-cover further comprises a second plurality of the slots, the first plurality corresponding to the second plurality.

18. The method of claim 14, wherein the combined display assembly further comprises a third plurality of the attachment holes, wherein the A-cover further comprises a fourth plurality of the threaded receptacles, and wherein fixing the combined display assembly and the A-cover at the second edge further comprises using a fifth plurality of the mechanical fasteners, the third plurality corresponding to the fourth plurality and the fifth plurality.

19. The method of claim 14, wherein the combined display assembly further comprises a touch panel included at least in part with the cover glass.

20. The method of claim 14, wherein making the electrical connections further comprises:
making functional connections for the LCD cell; and
making functional connections for the touch panel.

* * * * *